United States Patent [19]
Yokoo

[11] 3,932,844
[45] Jan. 13, 1976

[54] COMMON CONTROL SWITCHING SYSTEM

[75] Inventor: Teruo Yokoo, Tokyo, Japan

[73] Assignee: Nippon Electric Company, Ltd., Tokyo, Japan

[22] Filed: Jan. 8, 1973

[21] Appl. No.: 322,047

[30] Foreign Application Priority Data
Jan. 11, 1972  Japan.................................. 47-4959

[52] U.S. Cl.......... 340/172.5; 179/15 A; 179/18 ES
[51] Int. Cl............................................. G06f 15/46
[58] Field of Search ..... 340/172.5; 179/2, 18, 15 R, 179/15 A

[56] References Cited
UNITED STATES PATENTS

| | | |
|---|---|---|
| 3,378,818 | 4/1968 | Adelaar............................ 340/172.5 |
| 3,671,942 | 6/1972 | Knollman......................... 340/172.5 |
| 3,727,192 | 4/1973 | Cheney et al..................... 340/172.5 |
| 3,729,715 | 4/1973 | Buedel............................. 340/172.5 |

*Primary Examiner*—Gareth D. Shaw
*Assistant Examiner*—John P. Vandenburg
*Attorney, Agent, or Firm*—Sughrue, Rothwell, Mion, Zinn & Macpeak

[57] ABSTRACT

The common control equipment of a switching system including a plurality of functional block circuits is comprised of equipment for selectively actuating said functional block circuits in a desired sequence, which sequence is stored in a memory in said equipment. Several memories are provided to enable several sequences to be stored simultaneously so that any stored sequence can be actuated. In compliance with the type of connection requested by a call, the control equipment selects the memory equipment which stores the sequence that establishes the requested connection.

4 Claims, 4 Drawing Figures

COMMON CONTROL SWITCHING SYSTEM

BACKGROUND OF THE INVENTION

This invention relates to a common control switching system including a plurality of functional block circuits and, more particularly, to a control circuit for selecting desired ones of the functional block circuits and putting the selected functional block circuits into operation.

It is already known that a common control switching system including wired logic generally comprises a plurality of functional block circuits in the common control equipment. Examples of the functional block circuits are call detection circuits, line selection circuits, trunk equipment selection circuits, trunk class specification circuits, channel selection circuits, speech channel switch driving circuits, and busy test circuits. In this connection, it is to be remembered that a common control switching system comprises a common control equipment and a plurality of connection operation equipment, which are the peripheral equipment in some sense. Examples of the connection operation equipment as called herein are line circuits, links, switches, trunk equipment, and registers. The connection operation equipment may thus be classified into a plurality of groups according to the connection operations carried out thereby. The connection operation equipment forming each of the groups are coupled to at least one of the functional block circuits. Each connection operation equipment of the line circuit group is capable of delivering a signal to the common control equipment in response to a call originating with a local subscriber. Each connection operation equipment of the register group is capable of delivering a signal of one of predetermined levels or codes to the common control equipment in compliance with a numerical signal, such as a series of dial pulses or a multifrequency signal, registered therein. The predetermined levels are representative of types of connection known or pretranslated from the numerical signals. It may therefore be said that each connection operation equipment of at least two of the groups comprises an initiation signal circuit, responsive to a call arriving thereat and requesting a connection to be established by the switching system, for delivering an initiation signal to the common control equipment.

It has been the practice that the functional block circuits are accompanied by fixed wired logic which serve altogether as a control for the functional block circuits and, responsive to an initiation signal, select some of the functional block circuits required to establish a connection requested by a call responsive to which the initiation signal has been produced. Under the control of the wired logic, the selected functional block circuits in turn select connection operation equipment one from each group of connection operation equipment coupled to the selected functional block circuits, and make the selected connection operation equipment sequentially carry out their respective connection operations to establish the requested connection. It should therefore be noted that the connection of a type, as called herein, such as a dial tone connection, a tone trunk connection, a recorded announce trunk connection, a charging trunk connection, a dial pulse incoming trunk connection, an outgoing connection, an incoming connection, an intra-office connection, or a transit connection, is established by a sequence of connection operations caused to be carried out by a set of selected functional block circuits.

Because of the fixed wired logic, conventional common control switching systems of the type described are capable of accomplishing only the connections of the types for which the wired logics are designed. Changes and/or additions of the wired logics affect the mutual effects between some of the functional block circuits. It has therefore been troublesome to change the connection control capablilities of the wired logics and/or to add some new connection control capabilities and/or services.

On the other hand, electronic switching systems of the stored program types are known. Although very flexible, such electronic switching systems have been expensive and particularly uneconomical for medium and small-scale central offices.

SUMMARY OF THE INVENTION

It is therefore an object of the present invention to provide a common control switching system that is far less expensive than a conventional electronic switching system and yet more flexible than a conventional common control switching system including functional block circuits.

It is another object of this invention to provide a common control switching system including functional block circuits and yet operable in accordance with programs.

It is still another object of this invention to provide a common control switching system in which changes and/or additions are relatively easily affected in the connection control capabilities and/or the services.

According to this invention there is provided a switching system comprising common control equipment and a plurality of connection operation equipment groups, each consisting of a plurality of connection operation equipment, the connection operation equipment of each of said groups being capable of carrying out a connection operation specific to each group, the connection operation equipment of at least two of said groups comprising an initiation signal circuit responsive to a call reaching thereto and requesting a connection to be established by said switching system for producing an initiation signal, the connections to be established by said switching system being classified into a plurality of types, said initiation signal being of a level representative of the type of connection requested by a call responsive to which said initiation signal is produced, a connection of each of said types being established by making said connection operation equipment, sequentially carry out connection operations specific thereto, said common control equipment comprising a plurality of functional block circuits and control means, the connection operation equipment of each of said groups being coupled to at least one of said functional block circuits, said control means being coupled to the initiation signal circuits and to said functional block circuits and responsive to the level of an initiation signal produced by one of said initiation signal circuits being capable of selecting functional block circuits in compliance with the type of connection represented by the last-mentioned level and for causing the selected functional block circuits to select connection operation equipment, from each of connection operation equipment coupled to the selected functional block circuits and to make the selected connection operation equipment sequentially carry out connection operations specific thereto to establish the connection of the type represented by the last-mentioned level, wherein the improvement comprises:

end signal means in each of said functional block circuits for producing an end signal upon completion of the connection operation of connection operation equipment selected by said each functional block circuit, start signal means in each of said functional block circuits responsive to a start signal delivered thereto for initiating operation of said functional block circuits, a plurality of start signal generating means, each being connected and adapted for applying start signals in sequence and in preselected order to start signal means in said functional block circuits, each said generating means comprising a memory means for storing information indicia representative of said respective preselected order, and a control circuit responsive to the level of said initiation signal for selecting in accordance with said level one of said start signal generating means, and further responsive to said initiation signal and each said end signal for stepping said selected start signal generating means to cause said selected start signal generating means to generate the next start signal in its preselected order.

Figure 1:
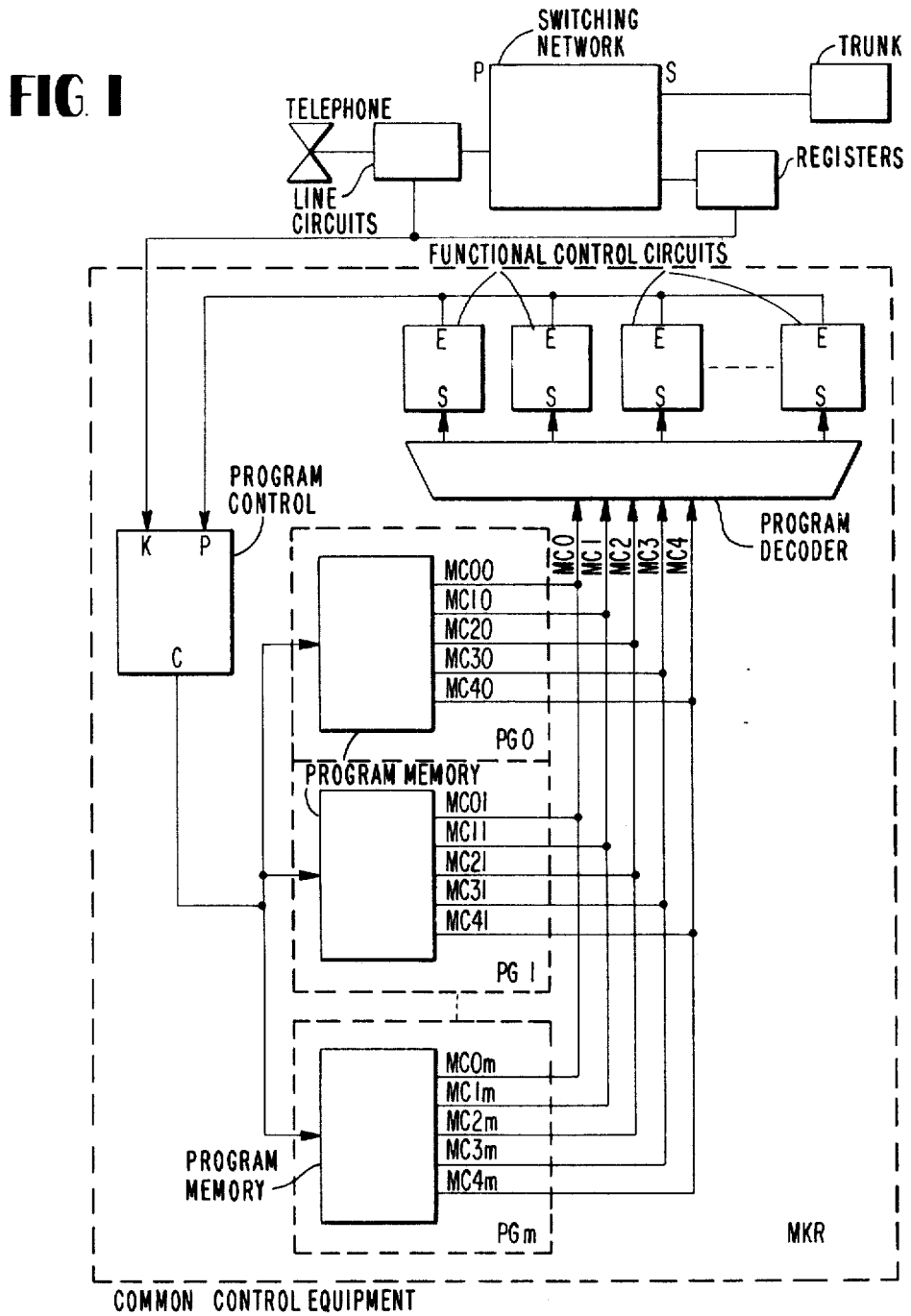
FIG. 1 is a block diagram of a first embodiment of the instant invention.
Figure 2:
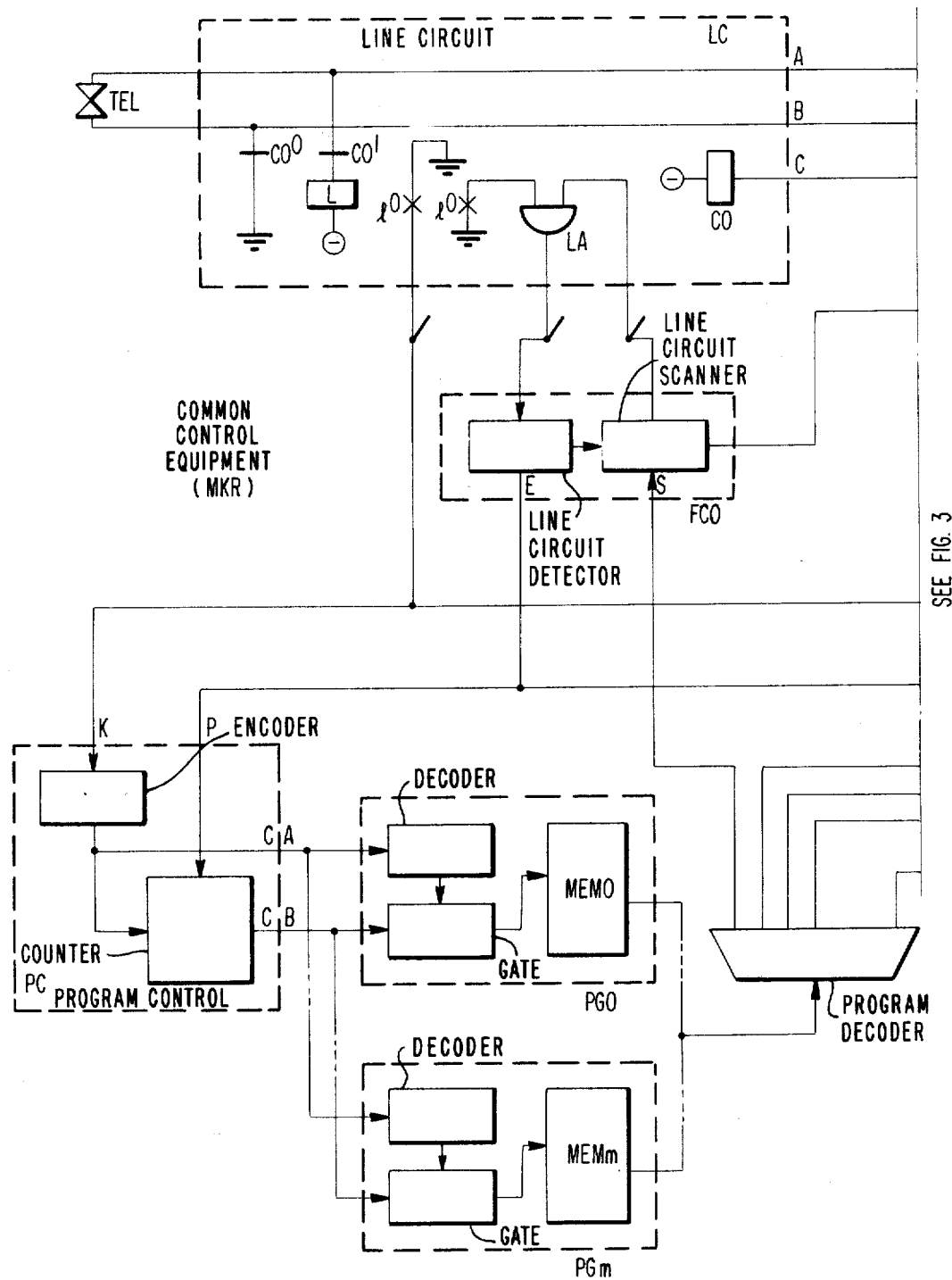
FIGS. 2 and 3, when put into side by side relation show more in detail the first embodiment generally depicted in FIG. 1.
Figure 3:
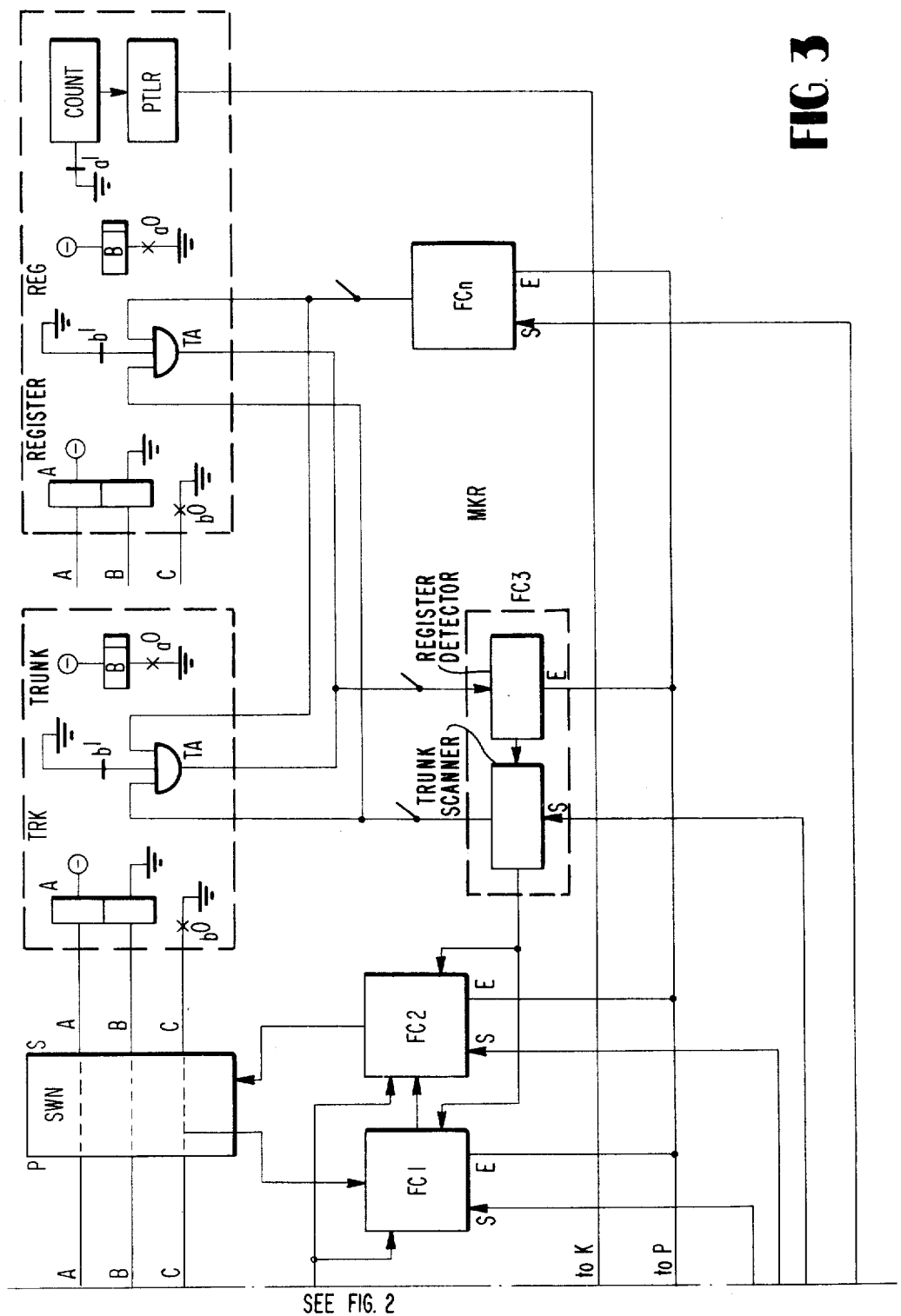
Figure 4:
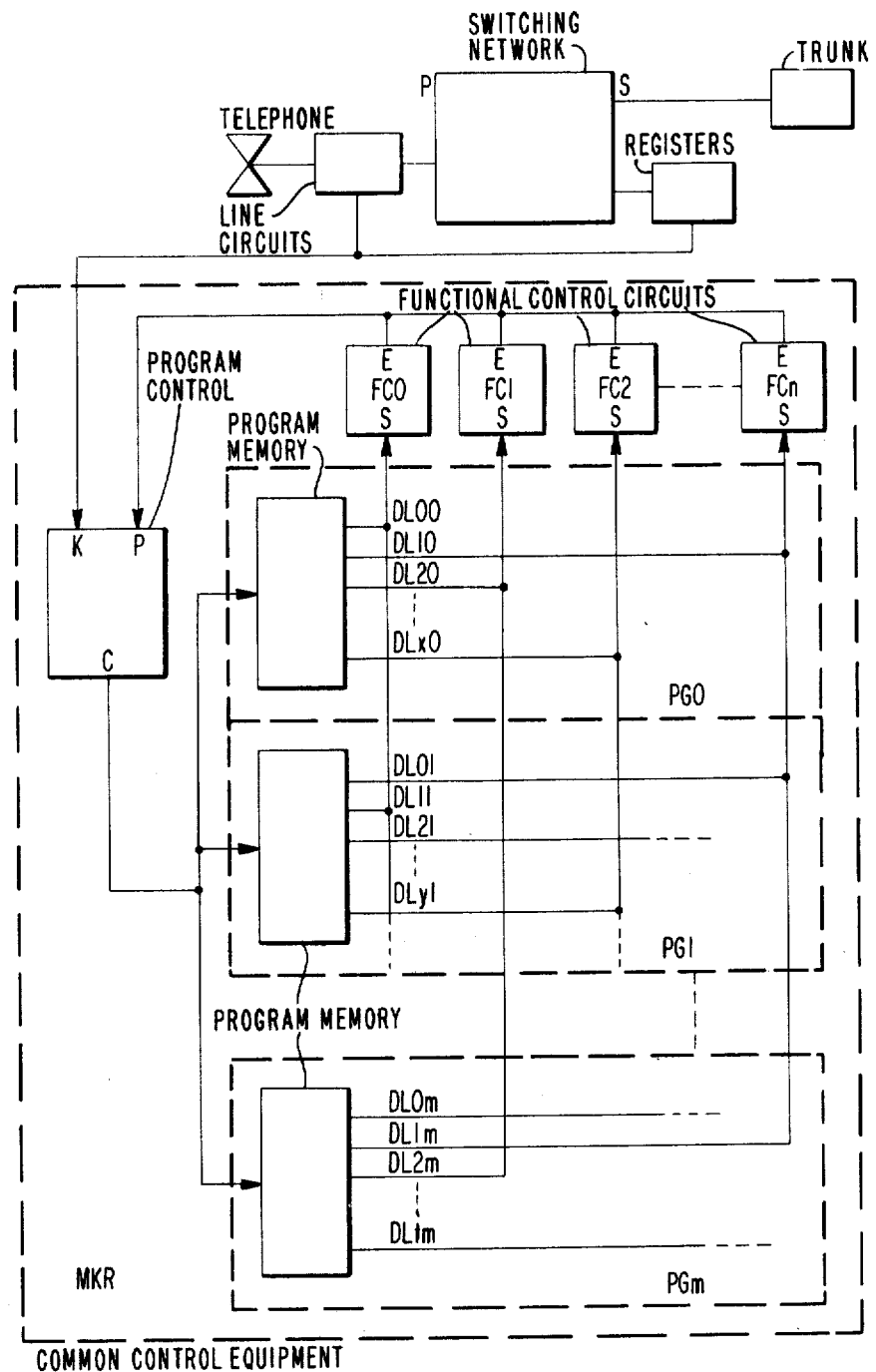
FIG. 4 is a block diagram of a second embodiment of the present invention.

DESCRIPTION OF THE PREFERRED EMBODIMENTS:

Referring to FIG. 1 and also to FIGS. 2 through 4, a common control switching system in general comprises a switching network SWN having a primary side P, a secondary side S, a plurality of links (only one link being depicted in FIG. 3 with three dashed lines), and a plurality of switches (not shown); a plurality of line circuits, such as LC, connected to subscriber stations, respectively, represented herein by a telephone substation TEL, and to the primary side P of the switching network SWN; a plurality of trunk equipment, such as TRK, connected to the secondary side S of the switching network SWN and to a plurality of interoffice trunk lines (not shown), a plurality of intra-office trunk lines (not shown), if any, and the primary side P of the switching network SWN through connections (not shown); a smaller number of registers, such as REG, connected to the secondary side S of the switching network SWN in the manner known in the art; and common control equipment represented by a marker MKR responsive to initiation signals, as called herein, supplied primarily from the line circuits and the registers for effecting connection control primarily on the switching network SWN to make a link and a set of accompanying switches establish a connection between concerned ones of the line circuits and trunk equipment as shown. The marker MKR comprises a plurality of functional block circuits FC0, FC1, FC2, . . . , and FCn, each effecting specific connection control on the line circuits, the switching network SWN, the trunk equipment, and registers. In a conventional common control switching system including the functional block circuits, the functional block circuits are accompanied by fixed wired logics (not shown). Each of the functional block circuits FC0, FC1, FC2, . . . , and FCn has an input terminal S and an output terminal E and is capable of starting a specific connection control operation responsive to a start signal supplied to the input terminal S in the manner later described and of producing an end signal at the output terminal E upon completion of the specific connection control operation.

Referring in particular to FIG. 1, the marker MKR used in a first embodiment of the present invention comprises program operation means composed of a plurality of program memory devices PG0, PG1, . . . , and PGm having program memories PM0, PM1, . . . , and PMm, respectively, and a program decoder DEC. Each of the program memories PM0, PM1, . . . , PMm memorizes a program corresponding to one of the types of connections and sequentially specifying some or all of the functional block circuits FC0, FC1, FC2, . . . , and FCn in compliance with the said one type of connection and has a plurality of memory connections, at least equal in number to the number of functional block circuits specified by the program. In the example being illustrated, the program memory devices PG0, PG1, . . . , and PGm comprise memory connections MC00, MC10, MC20, MC30, and MC40; MC01, MC11, MC21, MC31, and MC41; . . . ; and MC0m, MC1m, MC2m, MC3m, and MC4m; respectively. The corresponding memory connections, such as MC00, MC01, . . . , and MC0m, are united together into decoder connections MC0, MC1, MC2, MC3, and MC4 leading to the program decoder DEC. It will be appreciated in connection with the depicted example that each program memory energizes selected ones of the memory connections connected thereto in the order specifying the functional block circuits. The first embodiment further comprises program control means PC having an initiation or key signal input terminal K coupled to the initiation signal circuits of the line circuits and of the registers, an end signal or pulse input terminal P connected to the end signal output terminals E of the functional block circuits FC0, FC1, FC2, . . . , and FCn, and a control signal output terminal C coupled to the program memories PM0, PM1, . . . , and PMm. Responsive to the level of an initiation signal supplied to the initiation signal input terminal K, the program control means PC delivers a program start signal to the program memories. The program start signal may be of a program code specific to the level of the initiation signal and consequently to the type of connection requested by a call and be received only by one of the program memories that memorizes the program corresponding to the type of connection. Alternatively, the program control means PC may supply the program start signal only to one of the program memories that memorize a program corresponding to the type of connection. Responsive to the end signals, the program control means PC delivers program step signals from the control signal output terminal C to the program memories. The program step signals are effective only in the program memory keyed by the program start signal. Alternatively, the program control means PC supplies the program step signals only to that program memory to which the program start signal has most recently been supplied. Responsive to the program start and the program step signals, the pertinent program memory delivers program output signals to the selected program connections coupled thereto in the order complying with the type of connection requested by the call. In response to the program output signals, the program decoder DEC supplies the start signals to the start signal input terminals S of the pertinent functional block circuits to make the latter sequentially carry out their respective connection control operations. In case the total number of the functional block circuits FC0, FC1, FC2, ..., and FCn are 32 or less, each of the program memories PM0, PM1, ..., and PMm may produce a five-bit parallel binary program output signal to its five memory connections in response to each of the program start and program step signals. Each program memory may be a core memory, or an integrated circuit read only memory.

Referring more particularly to FIGS. 2 and 3, the marker MKR used in the first embodiment of the instant invention comprises a plurality of program memory devices, such as PG0 and PGm, for memorizing programs, respectively. Each of the program memory devices has two input terminals for application thereto of the control signals described below and, responsive to the control signals applied thereto and in compliance with the program memorized therein, produces a signal of serial operation codes successively specifying those of the functional block circuits FC0, FC1, ..., and FCn which carry out the sequence of connection control operations specified by the memorized program. The marker MKR further comprises a program decoder DEC having a plurality of output leads connected to the start signal input terminals S of the respective functional block circuits FC0, FC1, ..., and FCn. In accordance with each of the serial operation codes supplied from the program memory devices, the decoder DEC delivers a start signal to one of the functional block circuits that is specified by the supplied operation code. By way of example, the specific connection operations of the functional block circuits FC0, FC1, FC2, FC3, and FCn are call originating line circuit selection circuit, channel selection circuit, switch driving circuit, trunk selection circuit, and trunk class specification circuit, respectively. As an example, it may be assumed that the zeroth program memory device PG0 memorizes a program for the dial tone connection. Responsive to the serial operation codes supplied from the dial tone connection program memory device PG0, the decoder DEC successively supplies the start signals to the call originating line circuit selection circuit FC0, the trunk class specifying circuit FCn, the trunk selection circuit FC3, the channel selection circuit FC1, and then the switch driving circuit FC2. The marker MKR still further comprises program control means PC having a first input terminal K connected to the initiation signal circuits of the line circuits and of the registers, a second input terminal P connected to the end signal output terminals E of the functional block circuits, and a control signal output terminal, here divided into first and a second terminals CA and CB, connected to the input terminals of the program memory devices. Responsive to an initiation signal supplied to the first input terminal K from one of the line circuits and the registers and representative of the type of connection requested, the program control means PC delivers a program start signal to the program memory devices. Responsive either to production of a program start signal or to application of an end signal to the second input terminal P from one of the functional block circuits that has just carried out the connection control operation specific thereto, the program control means PC delivers from the second output terminal CB a program step signal to the program memory devices. More particularly, the program control means PC comprises an encoder COD, responsive to the initiation signals representative of various types of connection requested, for delivering the program start signals of specific program codes indicative of the respective programs and a counter PCNT put into operation by each program start signal and stepped by each end signal for delivering a step signal to the program memory devices. Each program memory device comprises a control decoder, such as DC0 or DCm, responsive to the program start signal of the specific program code indicative of the program memorized therein for producing a gate signal and holding the same for a duration corresponding to the time required to complete the sequence of connection operations specified by the program, a gate circuit, such as G0, or Gm, enabled by the gate signal for allowing the program step signals to pass therethrough, and program memory, such as MEM0 or MEMm, responsive to the program step signals supplied thereto for delivering the signal of the serial operation codes to the program decoder DEC.

Further referring to FIGS. 2 and 3, a dial tone connection will be described in conjunction with the example illustrated with reference thereto. When a local subscriber originates a call by going off-hook at the telephone substation TEL of the rotary dial type, a conventional line relay L operates in the line circuit LC connected to the call originating telephone substation TEL in the known manner through break contacts $co^0$ and $co^1$ of a conventional cutoff relay CO. The line relay L closes a zeroth and a first make contact $1^0$ and $1^1$ to deliver ground as the level of a dial tone connection initiation signal to the program control means PC and to enable a line gate LA, respectively. Responsive to the dial tone connection initiation signal, the encoder COD delivers a program start signal of a specific code specifying the dial tone connection program memory device PG0 to the program memory devices and makes the counter PCNT deliver a first program step pulse also to the program memory devices. Responsive to this program start signal, only the control decoder DC0 of the dial tone connection program memory device PG0 produces a gate signal to enable the associated gate circuit G0 for a duration corresponding to the time required to complete the sequence of connection operation specified by the memorized program. Responsive to the first program step pulse supplied through the enabled gate circuit G0, the program memory MEM0 delivers the first one of the serial codes for the dial tone connection that specifies the call originating line circuit selection circuit FC0 to the program decoder DEC. In compliance with the last-mentioned code, the program decoder DEC delivers a start signal to the last-mentioned functional block circuit FC0 to make therein a line circuit scanner LSCN step to successively supply a series of line circuit test pulses to the line circuits starting at a predetermined line circuit whose equipment number is, for example, zero. In the service requesting line circuit LC, the line circuit test pulse supplied thereto passes through the enabled line gate LA back to a service requesting line circuit detector DETL of the call originating line circuit selection circuit FC0, which sends an end signal to the program control means PC and stops the stepping of the line circuit scanner LSCN to retain therein the equipment number of the service requesting line circuit LC. Responsive to this end signal, the counter PCNT produces a second program step pulse to make the memory MEMO of the dial tone connection program memory device PG0 produce the second one of the serial codes, which makes the program decoder DEC deliver a start signal to the trunk class specifying circuit FGn, which is capable of setting therein the register class as the trunk class. As soon as the register class is set, the register class specifying circuit FCn produces an end signal. Each of the trunks and the registers comprises a conventional B position relay operable in the known manner through a make contact of a conventional A position relay connected to the so-called A and B wires and energized while the trunk equipment or the register is busy to close a make contact $b^0$ and a break contact $b^1$ to place ground on the so-called C wire and to disable a trunk gate or a register gate TA, respectively. The register class set in the register class specifying circuit FCn enables those register gates of the registers, such as REG, which are not disabled by the register B position relays. Responsive to the end signal produced by the register class specifying circuit FCn, a start signal is sent to a trunk and register scanner TSCN of the trunk and register selection circuit FC3 which now begins to step and successively supply a series of trunk and register test pulses to the trunk equipments and the registers in the manner the line circuit scanner LSCN does. In an idle register REG, the trunk and register test pulse supplied thereto passes through the enabled register gate TA back to an idle trunk and register detector DETT of the trunk and register selection circuit FC3, which sends an end signal to the program control means PC and stops the stepping of the trunk and register scanner TSCN to retain therein the equipment number of the selected trunk equipment or register, in the present case, the equipment number of the register REG. A start signal is now delivered to the channel selection circuit FC1, which selects an idle link with reference to the ground placed on the C wires of the busy links in a conventional manner from those links preselected in consideration of the equipment number of the service requesting line circuit LC supplied from the line circuit scannen LSCN and of the equipment number of the trunk equipment or register, such as the equipment number of the register REG, supplied from the trunk and register scannen TSCN. As soon as the channel information is obtained, the channel selection circuit FC1 retains the information therein and produces an end signal. Supplied with a start signal, the switch driving circuit FC2 operates the switch selected in accordance with the equipment numbers supplied from the line circuit scanner LSCN and the trunk and register scanner TSCN and with the channel information supplied from the channel selection circuit FC1 to establish a connection between the service requesting line circuit LC and the selected register REG and then to produce an end signal. In the selected register REG which has been seized or reserved up to the establishment of the connection, the A position relay operates to energize the B position relay. Upon energization of the B position relay, ground is placed on the C wire to hold the connection and to operate the cutoff relay C0 in the service requesting line circuit LC, thereby switching the A and the B wires from the line relay L to the call originating telephone substation TEL for dialing.

Still further referring to FIGS. 2 and 3, let it now be assumed that a register REG for dial pulses has received a series of dial pulses representative of a called subscriber. A counter COUNT provided in the register REG registers the dial pulses through a make contact $a^1$ of the A position relay. The registered count is pretranslated by a pretranslator PTLR, which applies to the encoder COD of the program control means PC an initiation signal of a level predetermined according to the type of connection requested by the service requesting register REG, such as an outgoing call, an incoming call, an intra-office call, or a transit call.

Referring more particularly to FIG. 4, the marker MKR used in a second embodiment of this invention comprises a plurality of program memory devices PG0, PG1, . . . , and PGm, each connected to the start signal input terminals S of a predetermined number ($x + 1$ for the zeroth program memory device PG0, $y + 1$ for the first program memory device PG1, . . . , and $t + 1$ for the $m$-th program memory device PGm, each of $x$, $y$, . . . , and $t$ being representative of zero or a positive integer that is equal to $n$ or less) of the functional block circuits FC0, FC1, . . . , and FCn and adapted to memorize a program specifying a sequence of connection control operations of the predetermined number of the functional block circuits FC0, FC1, . . . , and FCn. More specifically, the program memory devices PG0, PG1, . . . , and PGm comprise a plurality of program drive circuits PD0, PD1, . . . , and PDm, respectively, each having an input terminal and a predetermined number of output terminals and operable in the manner described later, and a plurality of jumpers or drive lines DL0i, DL1i, . . . , and DLui ($i$ being representative of one of zero and positive integers 0, 1, . . . , and $m$ and $u$ being representative of one of $x$, $y$, . . . , and $t$) interconnecting the output terminals of the program drive circuits PD0, PD1, . . . , and PDm and the input terminals S of the functional block circuits FC0, FC1, . . . , and FCn in a prescribed manner described hereunder. The marker MKR further comprises program control means PC having a first input terminal K connected to the initiation signal circuits of the line circuits and of the registers, a second input terminal P connected to the end signal output terminals E of the functional block circuits FC0, FC1, . . . , and FCn, and a control signal output terminal C connected to the input terminals of the program drive circuits PD0, PD1, . . . , and PDm. Responsive to an initiation signal supplied to the first input terminal K from one of the line circuits and the registers and representative of the type of connection requested, the program control means PC delivers from the output terminal C a program start signal to a program driving circuit PDi selected in compliance with the type of connection requested. The selected program circuits PDi now supplies a start signal to one of the functional block circuits FC0, FC1, . . . , and FCn that is connected to the zeroth drive line DL0i of the selected program memory device PGi. Responsive to an end signal supplied to the second input terminal P from the said one functional block circuit, the program control means PC delivers from the output terminal C a program step signal to the selected program drive circuit PDi, which supplies a second start signal to the other one of the functional block circuits FC0, FC1, . . , and FCn that is connected to the drive line DL1i of the program memory device PGi. Responsive to the subsequent end signals supplied from those of the functional block circuits FC0, FC1, . . . , and FCn which are connected to the first through the $(u-1)$-th drive lines DL1i through DL$(u-1)$i (not shown) of the selected program memory device PGi, respectively, the program control means PC successively delivers program step signals to the selected program drive circuit PDi. Consequently, the program drive circuit PDi successively supplies start signals to those of the functional block circuits FC0, FC1, . . . , and FC$n$ which are connected to the second through the $u$-th drive lines DL2i (not shown) through DLui of the selected program memory device PGi. A predetermined time after an end signal is supplied to the second input terminal P, the program control means PC is reset for reception of another initiation signal. Thereupon a sequence of connection operations specified by the program memorized in that program memory device PGi comes to an end which was selected by the most recent initiation signal.

What is claimed is:

1. A telecommunications switching system comprising common control equipment and a plurality of connection operation equipment groups, each group consisting of a plurality of connection operation equipment, each connection operation equipment in said groups being capable of carrying out a connection operation specific to each said group, each connection operation equipment of at least two of said groups comprising an initiation signal circuit responsive to a call reaching thereto and requesting a connection to be established through said switching system for producing an initiation signal, the connections to be established through said switching system being classified into a plurality of types, said initiation signal being of a level representative of the type of connection requested by a call responsive, to which said initiation signal is produced, a connection of each of said types being established by making selected connection operation equipment, selected in compliance with said each type of connection, sequentially carry out connection operations specific thereto, said common control equipment comprising a plurality of functional block circuits and control means, connection operation equipment of each of said groups being coupled to at least one of said functional block circuits, said control means being coupled to the initiation signal circuits and to said functional block circuits and responsive to the level of an initiation signal produced by one of said initiation signal circuits for selecting functional block circuits in compliance with the type of connection represented by the said level and for causing the selected functional block circuits to select connection operation equipment, one from each of the groups of connection operation equipment coupled to the selected functional block circuits, thereby causing the selected connection operation equipment to sequentially carry out connection operations specific thereto to establish the connection of the type represented by said initiation signal level, wherein the improvement comprises:

a. end signal means in each of said functional block circuits for producing an end signal upon completion of the connection operation of one of connection operation equipment selected by said each functional block circuit,
 b. start signal means in each of said functional block circuits responsive to a start signal delivered thereto for initiating operation of said functional block circuits,
 c. a plurality of start signal generating means, each being connected and adapted for applying start signals in sequence and in preselected order to start signal means in said functional block circuits, each said generating means comprising a memory means for storing information indicia representative of said respective preselected order, and
 d. a control circuit responsive to the level of said initiation signal for selecting in accordance with said level one of said start signal generating means, and further responsive to said initiation signal and each said end signal for stepping said selected start signal generating means to cause said selected start signal generating means to generate the next start signal in its preselected order.

2. A switching system as claimed in claim 1, wherein said plurality of start signal generating means further comprises a decoder coupled to and common to all said memory means and to said functional block circuits,
 each of said memory means being capable of memorizing a sequence of operation coded signals that corresponds to one of said types of connection and, responsive to a control signal delivered to said memory means from said control circuit in compliance with the last-mentioned type of connection, for sequentially delivering said memorized operation coded signals to said decoder, the coded signals of said sequence corresponding to functional block circuits,
 said decoder responsive to said operation coded signals delivered thereto for sequentially delivering start signals to the start signal means of functional block circuits specified by said operation coded signals.

3. A switching system as claimed in claim 2, wherein:
 said control circuit comprises encoder means coupled to said initiation signal circuits and responsive to the level of an initiation signal delivered thereto for producing an initiation code representative of the type of connection represented by the last-mentioned level,
 each of said start signal generating means comprising a control decoder coupled to said encoder means and responsive to a respective one of said initiation codes delivered thereto for producing a gate signal,
 said control circuit further comprising counter means, coupled to said encoder means and to said end signal means of said functional block circuits and responsive to an initiation code and to end signals for producing program step signals,
 each of said start signal generating means further comprising a gate circuit, coupled to the control decoder and the memory means of said start signal generating means and to said counter means, said gate circuit being enabled by a gate signal produced by said last-mentioned control decoder, and responsive to program step signals delivered to the said gate circuit from said counter means, for allowing the last-mentioned step pulses to pass therethrough to the last-mentioned memory means,
 said memory means of each of said start signal generating means being responsive to program step signals having passed through the respective gate circuit for sequentially delivering operation coded signals stored therein to said decoder.

4. A switching system as claimed in claim 1, wherein each of said start signal generating means comprises a drive circuit and a plurality of jumpers, said drive circuit having an input terminal coupled to said control circuit and a plurality of output terminals and, being responsive to a control signal delivered thereto from said control circuit responsive to the level of an initiation signal produced by one of said initiation signal circuits, for producing drive signals successively at the output terminals of said drive circuit, said jumpers interconnecting the output terminals of said drive circuit and said start signal means of said functional block circuits whereby the interconnections may be physically altered to provide any desired sequence of operation of said functional block circuits.

* * * * *